(12) United States Patent
Martinez

(10) Patent No.: US 9,208,533 B2
(45) Date of Patent: Dec. 8, 2015

(54) METHOD FOR CONCEALING A SYNTHETIC HOLOGRAM IN A BINARY IMAGE

(75) Inventor: Christophe Martinez, Grenoble (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 254 days.

(21) Appl. No.: 13/821,432

(22) PCT Filed: Sep. 8, 2011

(86) PCT No.: PCT/FR2011/052055
§ 371 (c)(1),
(2), (4) Date: Aug. 19, 2013

(87) PCT Pub. No.: WO2012/032267
PCT Pub. Date: Mar. 15, 2012

(65) Prior Publication Data
US 2013/0322680 A1     Dec. 5, 2013

(30) Foreign Application Priority Data

Sep. 8, 2010 (FR) ..................... 10 57127

(51) Int. Cl.
*G06K 9/00* (2006.01)
*G06T 1/00* (2006.01)
*G03H 1/00* (2006.01)
*G03H 1/08* (2006.01)
*G03H 1/30* (2006.01)

(52) U.S. Cl.
CPC .............. *G06T 1/005* (2013.01); *G03H 1/0011* (2013.01); *G03H 1/08* (2013.01); *G03H 2001/0016* (2013.01); *G03H 2001/0022* (2013.01); *G03H 2001/085* (2013.01); *G03H 2001/0825* (2013.01); *G03H 2001/303* (2013.01); *G03H 2210/52* (2013.01); *G03H 2210/53* (2013.01); *G03H 2210/54* (2013.01); *G03H 2223/13* (2013.01)

(58) Field of Classification Search
CPC combination set(s) only.
See application file for complete search history.

(56) References Cited

U.S. PATENT DOCUMENTS 4,033,665 A * 7/1977 Firester ........................... 359/29
4,109,996 A * 8/1978 Ersoy ................................ 359/9

(Continued)

OTHER PUBLICATIONS

Aoki, Y: "Watermarking Technique using Computer-Generated Holograms", Electronics & Communications in Japan, Part III—Fundeamentalelectronic Science, Wiley, Hoboken, N J, US, Jan. 1, 2001, pp. 21-31, XP000975386, ISSN: 1042-0967 (supplied by applicant).*

(Continued)

*Primary Examiner* — Anand Bhatnagar
(74) *Attorney, Agent, or Firm* — Kevin R. Erdman; Brannon Sowers & Cracraft PC

(57) ABSTRACT

The invention relates to a synthetic hologram (64A) comprising first elementary cells wherein first openings are respectively defined, said hologram being integrated into a first portion of a binary motif (60), said binary motif comprising at least one second portion wherein second elementary cells comprising second openings (66) are defined, said second openings having an average size equal to the average size of the first openings, with a 5% margin, and a random phase shift.

18 Claims, 4 Drawing Sheets

(56) References Cited

U.S. PATENT DOCUMENTS

| | | | |
|---|---|---|---|
| 5,317,435 A * | 5/1994 | Kasazumi et al. | 349/2 |
| 5,745,265 A * | 4/1998 | Hasegawa et al. | 359/15 |
| 6,075,627 A | 6/2000 | Feldman | |
| 7,411,708 B2 * | 8/2008 | Waldman et al. | 359/29 |
| 7,738,152 B2 * | 6/2010 | Butler et al. | 359/30 |
| 8,804,221 B2 * | 8/2014 | Martinez | 359/9 |
| 2005/0134948 A1 * | 6/2005 | Waldman et al. | 359/3 |
| 2007/0268536 A1 * | 11/2007 | Holmes et al. | 359/2 |
| 2011/0002019 A1 * | 1/2011 | Routley et al. | 359/9 |

OTHER PUBLICATIONS

International Preliminary Report of Patentability for PCT/FR2011/052055, dated Mar. 12, 2013, by the European Patent Office.
Aoki, Y: "Watermarking Technique using Computer-Generated Holograms", Electronics & Communications in Japan, Part III—Fundeamentalelectronic Science, Wiley, Hoboken, NJ, US, Jan. 1, 2001, pp. 21-31, XP000975386, ISSN: 1042-0967.
International Search Report of PCT/FR2011/052055, dated Dec. 21, 2011, by the European Patent Office.

* cited by examiner

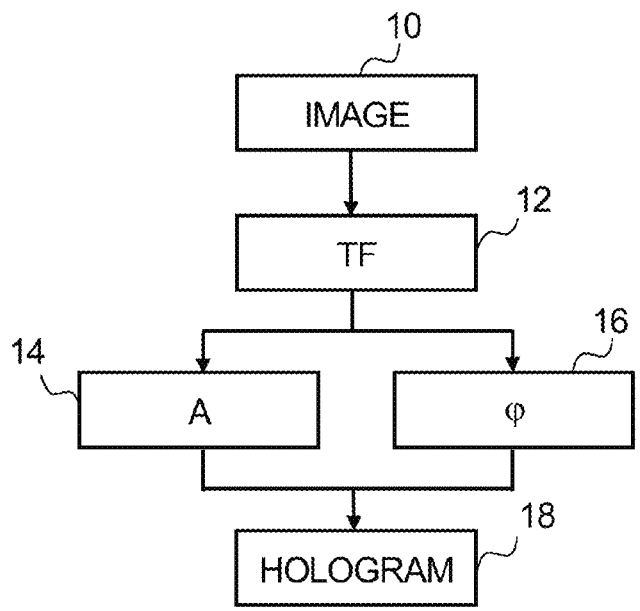
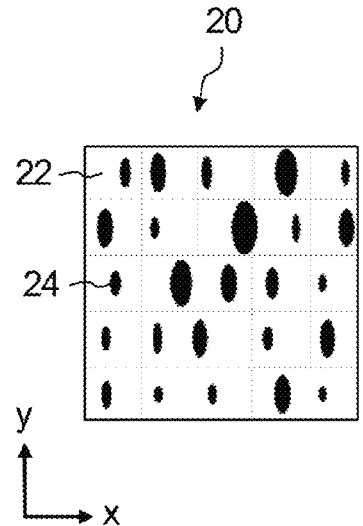
Figure 2
Figure 1
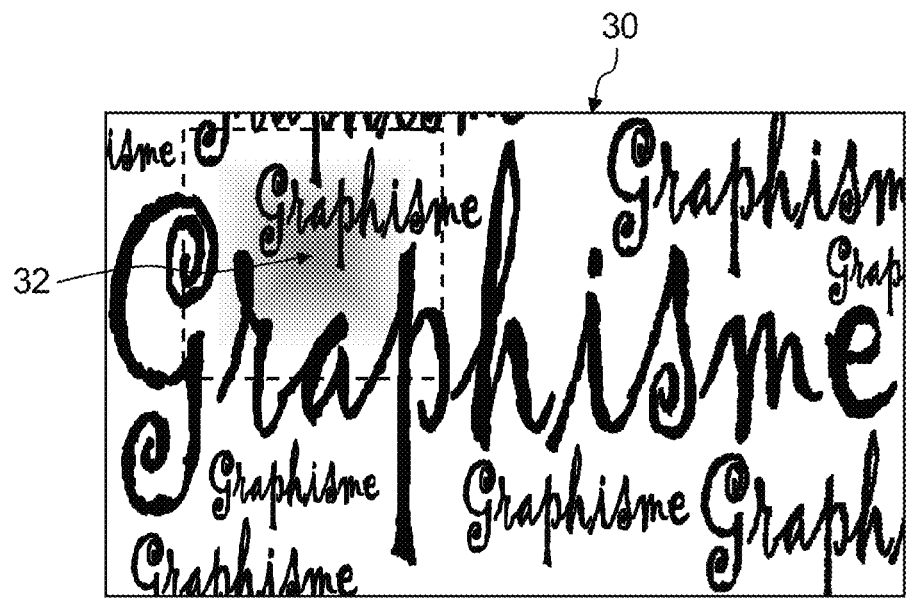
Figure 3

METHOD FOR CONCEALING A SYNTHETIC HOLOGRAM IN A BINARY IMAGE

CROSS-REFERENCE TO RELATED APPLICATIONS

The present application is a National Stage of PCT International Application Serial Number PCT/FR2011/052055, filed Sep. 8, 2011, which claims priority under 35 U.S.C. §119 of French Patent Application Serial Number 10/57127, filed Sep. 8, 2010, the disclosures of which are incorporated by reference herein.

FIELD OF THE INVENTION

The present invention relates to synthetic holograms. More specifically, the present invention relates to a method for concealing a synthetic hologram in a binary image.

DISCUSSION OF PRIOR ART

In many fields, especially in the luxury goods industry (for example, perfumery, jewelry or leather goods), or in the field of drugs, fighting against the copy of branded products is an everyday concern. Several methods are currently used to attempt to guarantee the authenticity of branded products. The simplest is to reproduce or to affix a brand logo on the products. However, a fraudster can easily reproduce a logo.

Other marking methods, which are more difficult to detect and to copy, are known. One of them comprises placing a transparent identification chip, invisible for the naked eye, on each of the products of a batch, a hologram being formed on the transparent chip. The hologram may be obtained by calculating the Fourier transform of an image representing, for example, the brand logo. The origin of the products is thus guaranteed by the presence or the absence of the hologram.

FIG. 1 illustrates a method for forming a synthetic hologram, for example, a coded-aperture hologram. It is started from an initial image 10 (IMAGE), for example, a logo or a brand, after which the Fourier transform of this image is calculated at a step 12 (TF). The calculation of this Fourier transform enables to obtain an amplitude image 14 (A) and a phase image 16 ($\phi$) of the Fourier transform. A synthetic hologram is then formed (step 18, HOLOGRAM) from the Fourier transform amplitude image A and from Fourier transform phase image $\phi$.

As an example a coded-aperture synthetic hologram is formed as follows. The images of amplitude A and of phase $\phi$ are divided into a predefined number of elementary cells. The hologram is also formed of a same number of elementary cells.

FIG. 2 illustrates an example of a synthetic coded-aperture hologram 20. In each elementary cell 22 of the hologram is formed an aperture 24. Apertures 24 are aligned, in each line, along a first direction y of the hologram. Surface area 24 of the apertures in each of the elementary cells of the hologram corresponds to the amplitude of the associated elementary cell of amplitude image A. The shifting of apertures 24 along a second direction x of the hologram corresponds to the phase of the associated elementary cell of phase image $\phi$.

Practically, a synthetic coded-aperture hologram may be formed on a thin glass plate having a thin opaque layer, for example, made of platinum oxide, deposited thereon. Portions of the platinum oxide are then etched to form transparent or opaque regions. In the case of the hologram of FIG. 2, the etched portions are the portions located outside of the contours of apertures 24.

Other types of synthetic holograms are known, and are especially described in the publication entitled "Computer generated holograms: an historical review", by G. Tricoles, Applied Optics 1981, vol. 26 no 20, pp. 4351-4360. Especially, synthetic holograms in which each of the elementary cells comprises several apertures having their respective sizes coding the amplitude and the phase of the Fourier transform of the corresponding elementary cell, holograms having each cell representing an interferogram portion having its width and its positioning coding the amplitude and the phase of the Fourier transform, or again holograms which directly code the phase by thickness changes of the glass plate on which the hologram is formed.

It is also known to combine synthetic holograms with binary images, that is, images with two color levels.

FIG. 3 illustrates such a combination.

FIG. 3 shows a visible binary image 30 comprising a repetition of word "Graphisme". On a portion of binary image 30 is integrated a synthetic hologram 32 having its contour delimited by dotted lines.

To integrate a hologram in a binary image without losing information, the elementary cells of the hologram superimposed to the dark portions of the binary image are inverted and phase-shifted by a phase shift close to $\pi$ according to a known technique, for example disclosed in unpublished French patent application FR 09/56913 of the applicant, filed on Oct. 5, 2009 (B9741).

An inversion of an elementary cell comprises, for example, in the case of the coded-aperture synthetic hologram of FIG. 2, inverting the clear and opaque portions of this cell. An elementary cell with a different shading than the initial cell is thus formed. A phase shift close to $\pi$ is then applied to the central pattern of the concerned cells. In known fashion, an elementary cell and an inverted and phase-shifted elementary cell provide identical diffraction effects.

A problem with the use of simple synthetic holograms is that such holograms are visible. Indeed, due to the calculation of the Fourier transform at step 12, a synthetic hologram is formed of a central portion more strongly marked (darker) than the rest of the hologram (see FIG. 3). Thus, a fraudster may spot the hologram and use an optical system capable of calculating the inverse Fourier transform of the hologram and thus obtain the image used to form this hologram. Once this image has been obtained, this person can easily recreate and copy the hologram.

Thus, there is a need for a method for forming integrated synthetic holograms in a visible image and with a location that cannot be detected.

SUMMARY

An object of an embodiment of the present invention is to provide a method of marking with a synthetic hologram in a visible image, avoiding for the hologram to be perceptible.

Another object of an embodiment of the present invention is to provide a method of marking with a synthetic hologram which cannot be directly read.

Thus, an embodiment of the present invention provides a synthetic hologram comprising first elementary cells having first apertures defined in each of them, integrated in a first portion of a binary pattern, the binary pattern comprising at least one second portion having second elementary cells comprising second apertures defined therein, the second apertures having an average size equal, to within 5%, to the average size of the first apertures, and a random phase shift.

According to an embodiment of the present invention, the binary pattern comprises a third portion in which is integrated a second synthetic hologram, phase-shifted by π, to within 10%, with respect to the hologram integrated in the first portion.

According to an embodiment of the present invention, the binary pattern further comprises one or several additional portions in which is integrated the synthetic hologram integrated in the first portion and one or several additional portions in which is integrated the second synthetic hologram.

According to an embodiment of the present invention, the synthetic hologram is of coded-aperture type.

An embodiment of the present invention further provides a method for concealing a synthetic hologram, formed from an initial image, in a binary pattern having dimensions greater than that of said hologram, comprising the steps of: (a) calculating a scrambled Fourier transform of the initial image to obtain a scrambled amplitude image and phase image; (b) forming a synthetic hologram from the scrambled amplitude image and phase image; (c) combining the synthetic hologram with a first portion of the binary pattern; (d) defining second apertures having an average size equal, to within 5%, to the average size of the first apertures; and (e) combining the second apertures with a second portion of the binary pattern.

According to an embodiment of the present invention, the second apertures are combined with the entire surface of the binary pattern which is not combined with the synthetic hologram.

According to an embodiment of the present invention, the second apertures have a random phase shift.

According to an embodiment of the present invention, the method further comprises, before step (d), a step of combining a second synthetic hologram with a third portion of the binary pattern, the second synthetic hologram being obtained from the synthetic hologram combined in the first portion by a π phase shift, to within 10%.

According to an embodiment of the present invention, the method further comprises, before step (d), a step of combining the synthetic hologram combined in the first portion with one or several additional portions of the binary pattern and combining the second synthetic hologram with one or several additional portions of the binary pattern.

According to an embodiment of the present invention, the combination of the hologram(s) with the binary pattern is performed by inserting apertures directly into the light portions of the binary pattern and by inserting apertures of the hologram inverted and phase-shifted by π, to within 10%, into the dark portions of the binary pattern.

An embodiment of the present invention further provides a method for reading a hologram such as defined hereabove, comprising a step of masking the third portion of the binary pattern.

BRIEF DESCRIPTION OF THE DRAWINGS

The foregoing and other features and advantages will be discussed in detail in the following non-limiting description of specific embodiments in connection with the accompanying drawings, among which:

FIG. 1, previously described, is a flowchart of a method for forming a synthetic hologram;

FIG. 2, previously described, illustrates an example of a coded-aperture synthetic hologram;

FIG. 3, previously described, illustrates a synthetic hologram superimposed to a visible binary pattern;

For clarity, the various drawings are not to scale.

DETAILED DESCRIPTION

To avoid for one or several holograms formed on a chip, having a binary pattern formed thereon, to be directly visible, it is provided to scramble this or these hologram(s).

Figure 4:
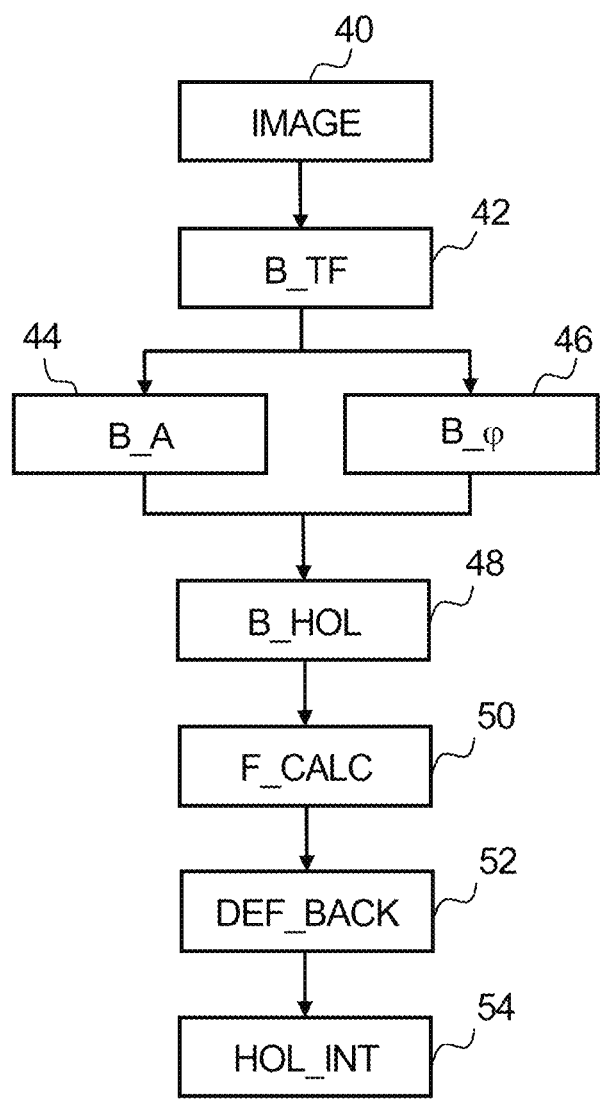
FIG. 4 is a flowchart of a method for scrambling a synthetic hologram according to an embodiment of the present invention.

FIG. 4 is a flowchart of such a method, the different steps of the method being detailed hereafter in the following description.

At a step 40, it is started from an image which is desired to be turned into a hologram. At a step 42, a scrambled Fourier transform of the image (B_TF) is calculated, which provides, at a step 44, a scrambled amplitude image (B_A) and, at a step 46, a scrambled phase image (B_φ) of the Fourier transform.

Based on scrambled amplitude image B_A and phase image B_φ of the Fourier transform, a synthetic hologram is formed at a step 48 (B_HOL), for example, a coded synthetic hologram such as the hologram of FIG. 2.

Then, at a step 50 (F_CALC), a number of characteristics of the hologram obtained at step 48 associated with the visible aspect of this hologram is calculated, to be able, at a step 52 (DEF_BACK), to define a contour region of the hologram. Finally, at a step 54 (HOL_INT), a hologram having its contour defined by the region formed at step 52 is integrated in the visible binary image, the hologram and the contour having a total size equal to that of the binary image.

The steps discussed in relation with the flowchart of FIG. 4 are detailed hereafter. Especially, step 42 is specified in relation with FIGS. 5 to 8 and steps 52 and 54 are specified in relation with FIGS. 9A and 9B.

Figure 5:
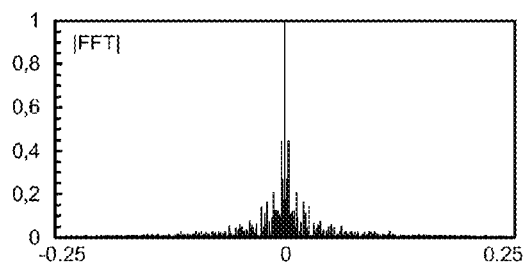
FIG. 5 is a curve of the amplitude of the Fourier transform of an image used to form a hologram, along a plane crossing the center of the amplitude image.
Figure 7A:
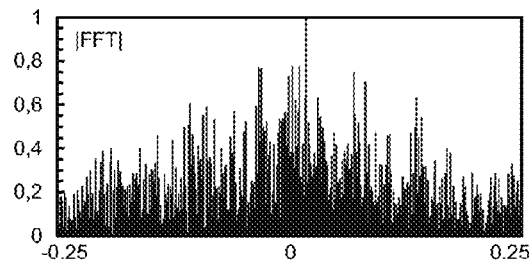
FIGS. 7A, 7B, 7C, and 7D respectively illustrate the amplitude of a second modified Fourier transform of an image used to form a hologram along a plane crossing the center of the amplitude image, an amplitude image obtained by the application of this modified Fourier transform, a phase image obtained by application of this modified Fourier transform, and an image obtained by direct reading of a hologram formed from the amplitude and phase images.

FIG. 5 is a curve of the amplitude of the Fourier transform of an image used to form a hologram, along a plane crossing the center of the amplitude image. The Fourier transform of the image has a very high peak at its center, which results in having the hologram directly formed from this Fourier transform mainly shaded at its center. Indeed, with a constant sampling to form the hologram from the Fourier transform, only the center of the hologram corresponds to a significant amplitude, and thus to a heavier shading at the hologram level.

To avoid the shading effect at the center of the hologram, it is provided to scramble the Fourier transform before forming the hologram (step 42). To achieve this, several techniques may be used, and especially scrambling techniques disclosed in patent application U.S. Pat. No. 4,013,338. Any other known scrambling technique may also be used. Methods for clipping the Fourier transform may also be used, as described hereafter.

Figure 6A:
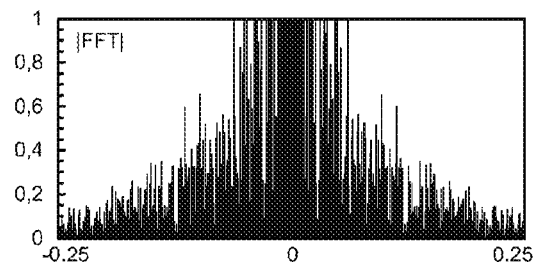
FIGS. 6A, 6B, 6C, and 6D respectively illustrate the amplitude of a first modified Fourier transform of an image used to form a hologram along a plane crossing the center of the amplitude image, an amplitude image obtained by the application of this modified Fourier transform, a phase image obtained by application of this modified Fourier transform and an image obtained by direct reading of a hologram formed from the amplitude and phase images.
Figure 6B:
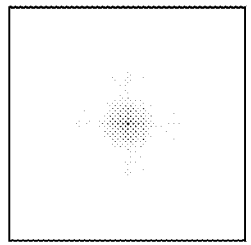
Figure 6C:
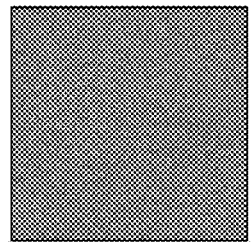

FIGS. 6A, 6B, 6C, and 6D illustrate a first case where the Fourier transform is clipped and respectively show the amplitude of a clipped Fourier transform, an amplitude image obtained by application of this clipped Fourier transform to an initial image, a phase image obtained by the application of this clipped Fourier transform to the initial image, and the image obtained by direct reading of a hologram formed from the amplitude and phase images of FIGS. 6B and 6C. The use of a clipped Fourier transform is relatively easy since it is sufficient, in order to obtain it, to limit the value of the central peak of the transform, as well as part of the secondary peaks which surround it.

Thus, a hologram formed from this Fourier transform has a central peak which is less marked than in the case of the Fourier transform of FIG. 5 (see FIG. 6B). However, although the central peak is attenuated, it is not totally concealed in the hologram and the hologram remains visible for an ill-intentioned person.

Figure 6D:
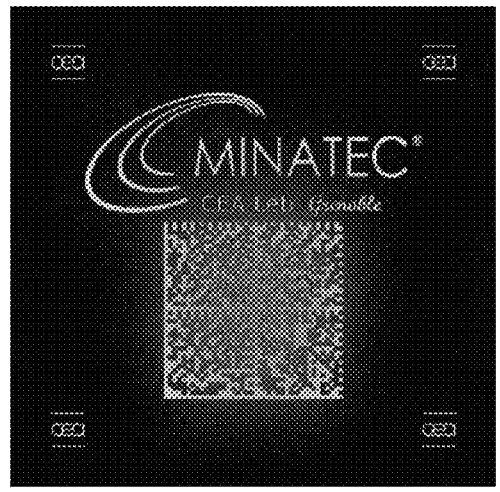

Further, the image reconstructed on reading of a hologram formed from a clipped Fourier transform is readable (in this case, a bidimensional matrix, "DataMatrix"), as illustrated in FIG. 6D, but comprises a central portion of low quality, the reading quality decreasing with the application of a significant clipping.

The Fourier transform thresholding technique thus enables to slightly conceal the hologram, which may however remain visible if the thresholding is not sufficient. If the thresholding is increased, the hologram is more difficult to read.

Thus, a scrambling such as described hereafter will be preferred over a thresholding, although a thresholding may be used at step 42.

FIGS. 7A, 7B, 7C, and 7D respectively illustrate the amplitude of a scrambled Fourier transform of an image used to form a hologram, an amplitude image obtained by the application of this scrambled Fourier transform to an initial image, a phase image obtained by application of this scrambled Fourier transform to an initial image, and an image obtained by direct reading of a hologram formed from the scrambled amplitude and phase images.

In the example of FIGS. 7A to 7D, the scrambling used is a phase scrambling which results in distributing the amplitude of the Fourier transform over the entire image, with no loss of information. As an example, this phase scrambling may be a scrambling such as the scrambling provided in patent application U.S. Pat. No. 4,013,338, or any known scrambling type, for example, a random phase scrambling.

Figure 7B:
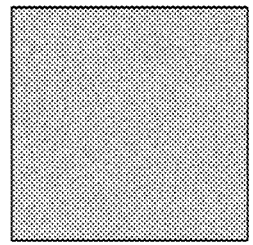

The application of a phase scrambling of the Fourier transform enables to distribute the amplitude of the Fourier transform over the entire image, and thus to obtain a uniform amplitude image (FIG. 7B).

Figure 7C:
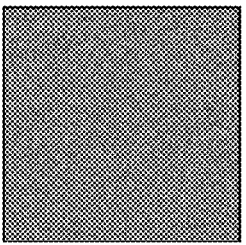
Figure 7D:
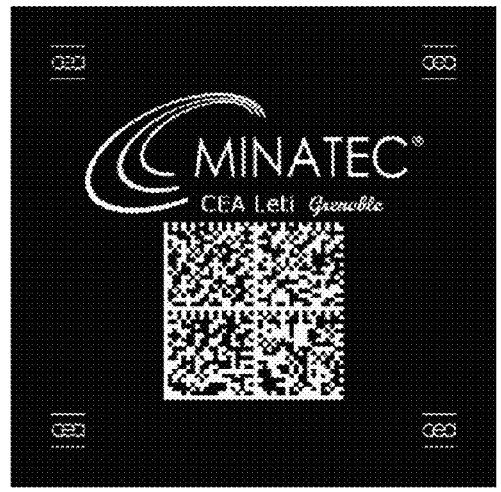

Advantageously, the hologram obtained from the amplitude image of FIG. 7B and from the phase image of FIG. 7C is uniform across its entire surface. Further, as illustrated in FIG. 7D, the image obtained by direct reading of the hologram, with an adapted optical device, is of very good quality (data matrix). This is due to the fact that the application of the scrambling implies no loss of information in the hologram.

Figure 8:
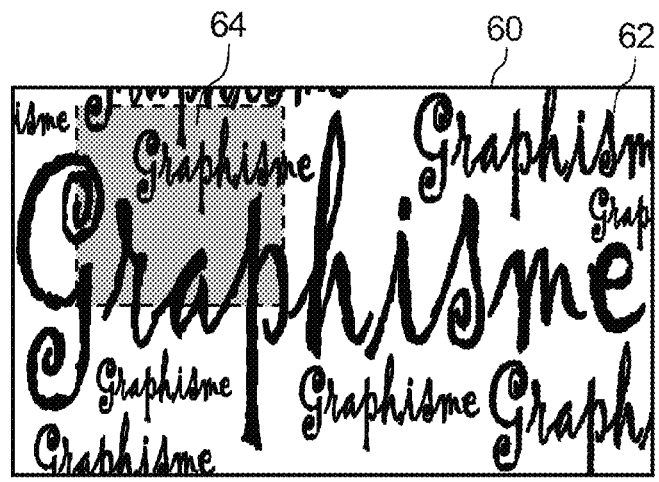
FIG. 8 illustrates a stacking of a visible binary pattern and of a scrambled hologram according to an embodiment of the present invention.

FIG. 8 illustrates a stacking of a visible binary pattern and of a scrambled hologram according to an embodiment of the present invention.

In FIG. 8, a scrambled hologram 64 is integrated in a visible image 60 comprising a number of binary patterns 62 (word "graphisme"). As previously described, to integrate the hologram in the binary image, said hologram is modified at the level of the dark portions of the binary image. For example, in the case of coded-aperture synthetic holograms, the cells at the level of the dark portions of the visible image are inverted (negative cells) and phase-shifted by $\pi$ (to within 10%).

Hologram 64 integrated in image 60 is, in the case of FIG. 8, visible since it forms a shaded area in the non-shaded background of patterns 62.

To conceal hologram 64 in image 60, it is provided to form a "decoy" area in image 60, all along the contour of hologram 64.

Figures 9A, 9B:
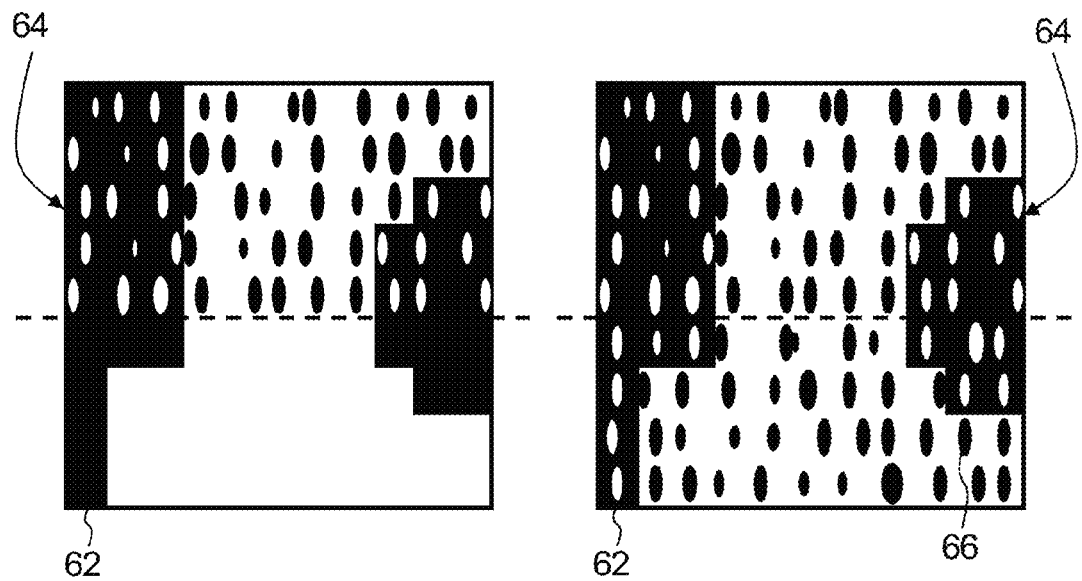
FIGS. 9A and 9B are enlarged views illustrating a processing applied to a structure such as that in FIG. 7.

FIGS. 9A and 9B illustrate this principle. FIG. 9A shows an enlargement of hologram 64 of FIG. 8, at a border of this hologram, the hologram contour being materialized by a dotted line.

FIG. 9B illustrates the enlargement of FIG. 9A after having formed a decoy area 66 all around the contour of hologram 64. The decoy area is formed of elementary cells of same size as the elementary cells of hologram 64, each elementary cell of the decoy area comprising one or several apertures having a shape similar to that of the apertures of the elementary cells of hologram 64.

The forming of apertures in the decoy area enables to obtain a contour of hologram 64 having a shading level identical to that of the hologram. Thus, the hologram cannot be distinguished from the decoy area.

To obtain such an aspect, the average, minimum, and maximum sizes of the apertures formed in hologram 64 may be determined, after which apertures may be defined in decoy area 66 having a size ranging between the minimum size and the maximum size, the apertures of decoy area 66 altogether having an average size equal or very close, to within 5%, to the average size of the apertures of hologram 64.

The decoy area may also be formed by separately harmonizing the areas formed in the dark portions of the visible image and the areas formed in the light portions of the visible image. To achieve this, the average, minimum, and maximum sizes of the apertures formed in the elementary cells of the dark areas of the visible image at the hologram level are defined, and random apertures are defined at the level of the dark portions of the decoy area corresponding to these characteristics. The same operation is then carried out between the light regions of the visible image at the hologram level and the light regions of the visible binary image of the decoy area.

It should be noted that any method enabling to provide for the aspect in the dark and light areas of the decoy area to be the same as in the corresponding dark and light areas of the hologram.

Especially, the apertures in the decoy area may also be larger than the largest apertures at the hologram level or smaller than the smallest apertures at the hologram level, as long as the average size of the apertures in the decoy area is equal or close, within a 5% limit, to the average size of the aperture in the hologram area.

The decoy area must generally have an aspect similar to the aspect of the scrambled hologram. Other techniques than those discussed herein may also be used to achieve this object.

The apertures formed in the decoy area are randomly phase-shifted so that the reading of the hologram is not disturbed by their presence. Indeed, if they are randomly generated, with no coherence, the signal that they diffract adds to the signal of the main grating diffraction orders, but not in holographic reconstruction orders. Thus, the reading is not disturbed by the presence of the random apertures of the decoy area.

Figure 10:
FIG. 10 illustrates the result obtained in the case of the integration of two scrambled holograms in a real image.

FIG. 10 illustrates the result obtained in the case of the integration of scrambled holograms in a real image.

FIG. 10 shows real binary image 60 of FIG. 8, comprising dark regions 62, where a hologram 64A is integrated.

The forming of the decoy area around hologram area 64A enables to conceal the hologram in a background having a same texture.

According to an alternative embodiment shown in FIG. 10, it may also be provided to form two or several synthetic holograms 64A and 64B in a same visible image of large size, the two synthetic holograms being phase-shifted with respect to each other by $\pi$, or by a phase shift close to $\pi$, to within 10%. This phase shift comprises phase-shifting each elementary cell of hologram 64B by $\pi$ with respect to each corresponding elementary cell of hologram 64A.

This enables to avoid for an ill-intentioned person knowing the existence of a hologram in image 60 to be able to trace back the image which has been used to form it Indeed, if a person attempting to fraud illuminates image 60 comprising the two phase-shifted holograms 64A and 64B with a device capable of reading a hologram, the beams originating from holograms 64A and 64B destructively interfere and do not enable to obtain the initial image used to form the hologram. Thus, even if this person knows that a hologram is concealed in image 60, he cannot trace back the image used to form the hologram.

To properly read the hologram and avoid the occurrence of destructive interferences, it is sufficient to mask one of the two holograms 64A and 64B. This reading is relatively easy when the location where the holograms are formed is at least approximately known.

It may also be provided to form more than two holograms 64A and/or 64B in image 60. This enables, once a first hologram or a first group of identical holograms have been masked, to ease the reading of the unmasked holograms. Indeed, when a single hologram is unmasked, the reading of this hologram is optimized if the reading beam aims at this hologram. When several identical holograms are not masked, the reading may be carried out without specifically aiming at a hologram. Indeed, in this case, the reading beam intercepts several hologram portions in phase, which enables to read the image with a good quality without requiring precisely aiming at the hologram.

It should be noted that, in addition to the above-described hologram scrambling steps, it may also be provided, before step 50 of the flowchart of FIG. 4, to perform an equalization of the amplitude of the Fourier transform of the initial image. Such an equalization may be achieved by any known method, and enables to obtain a scrambled amplitude image with a very smooth visual aspect.

Specific embodiments of the present invention have been described. Various alterations and modifications will occur to those skilled in the art. In particular, the concealing method disclosed herein applies to coded-aperture synthetic holograms, but also to any type of known synthetic hologram.

Further, the holograms provided herein may for example be formed by the structuring of an opaque layer formed on a support or substrate. As an example, the opaque layer may be made of a metal layer, for example, aluminum or chromium, formed by deposition. It may also be made of other materials. The structuring of the opaque layer may be performed by a lithographic-type step.

The support or substrate will preferably be transparent, for example, made of glass, sapphire, or quartz. It may also be opaque in the visible range if the reflectivity contrast with the metal is sufficient A combination of an aluminum layer deposited on the silicon substrate for example ensures this contrast.

Advantageously, the current writing resolution with this first lithography method is smaller than one micrometer, which is compatible with a pitch of the hologram cells ranging between 1 and 10 µm (which is here advantageous for a coded-aperture synthetic hologram such as shown in FIGS. 9A and 9B).

The hologram may also be formed on the substrate by a modification of its index, for example, by photosensitive effect or by modification of the thickness of a transparent layer formed at the surface of the substrate (it is then spoken of a phase or kinoform hologram).

In this case, generally, a lithography of a resin layer formed on the substrate is performed. After development of the insolated resin, the device surface has two thickness levels, that of the remaining resin and that of the substrate. This topography is transferred to the substrate by etching thereof, the resin being used as a mask. The height differences typically are on the order of the wavelength, that is, of a few hundreds of nanometers. This process is repeated several times with different patterns to eventually form a complex thickness structuring. Substrate thickness differences form phase differences on an incident beam, which enables to modify the phase thereof by following the desired holographic function.

Holographic materials, for example, holographic resins having an index capable of being modified proportionally to an insolation level, may also be used. Such materials are known by those skilled in the art.

In practice, to take advantage of the visual aspect of the hologram and align the read key thereof, for example, in the case described in relation with FIGS. 11A and 11B, the first solution for forming an etched metal layer on a support or substrate may be preferred.

The invention claimed is:

1. A binary image formed on a support, comprising:
   a first portion comprising a synthetic hologram comprising first elementary cells, wherein in each of the first elementary cells are defined first apertures; and
   at least one second portion comprising second elementary cells comprising second apertures defined therein, said second apertures having an average size equal, to within 5%, to the average size of the first apertures, and a random phase shift.

2. The binary image of claim 1, further comprising a third portion, in which is integrated a second synthetic hologram, phase-shifted by $\pi$, to within 10%, with respect to the hologram integrated in the first portion.

3. The binary image of claim 2, further comprising at least one additional portion in which is integrated the synthetic hologram integrated in the first portion and at least one additional portion in which is integrated the second synthetic hologram.

4. The binary image of claim 3, wherein the synthetic hologram is of coded-aperture type.

5. A method for reading the hologram of claim 2, comprising a step of masking the third portion of the binary image.

6. The binary image of claim 2, wherein the synthetic hologram is of coded-aperture type.

7. The binary image of claim 1, wherein the synthetic hologram is of coded-aperture type.

8. A method for concealing a synthetic hologram, formed from an initial image, in a binary image having dimensions greater than that of said hologram, comprising the steps of:
- (a) calculating a scrambled Fourier transform of the initial image to obtain a scrambled amplitude image and phase image;
- (b) forming a synthetic hologram from the scrambled amplitude image and phase image, said hologram comprising elementary cells having first apertures formed therein;
- (c) combining the synthetic hologram with a first portion of the binary image;
- (d) defining second apertures having an average size equal, to within 5%, to the average size of the first apertures; and
- (e) combining the second apertures with a second portion of the binary image.

9. The method of claim 8, wherein the second apertures are combined with the entire surface of the binary image which is not combined with the synthetic hologram.

10. The method of claim 9, wherein the second apertures have a random phase shift.

11. The method of claim 9, wherein the combination of the hologram(s) with the binary image is performed by inserting apertures directly into the light portions of the binary image and by inserting apertures of the hologram inverted and phase-shifted by $\pi$, to within 10%, into the dark portions of the binary image.

12. The method of claim 8, wherein the second apertures have a random phase shift.

13. The method of claim 12, wherein the combination of the hologram(s) with the binary image is performed by inserting apertures directly into the light portions of the binary image and by inserting apertures of the hologram inverted and phase-shifted by $\pi$, to within 10%, into the dark portions of the binary image.

14. The method of claim 8, further comprising, before step (d), a step of combining a second synthetic hologram with a third portion of the binary image, the second synthetic hologram being obtained from the synthetic hologram combined in the first portion by a $\pi$ phase shift, to within 10%.

15. The method of claim 14, further comprising, before step (d), a step of combining the synthetic hologram combined in the first portion with one or several additional portions of the binary image and combining the second synthetic hologram with one or several additional portions of the binary image.

16. The method of claim 15, wherein the combination of the hologram(s) with the binary image is performed by inserting apertures directly into the light portions of the binary image and by inserting apertures of the hologram inverted and phase-shifted by $\pi$, to within 10%, into the dark portions of the binary image.

17. The method of claim 14, wherein the combination of the hologram(s) with the binary image is performed by inserting apertures directly into the light portions of the binary image and by inserting apertures of the hologram inverted and phase-shifted by $\pi$, to within 10%, into the dark portions of the binary image.

18. The method of claim 8, wherein the combination of the hologram(s) with the binary image is performed by inserting apertures directly into the light portions of the binary image and by inserting apertures of the hologram inverted and phase-shifted by $\pi$, to within 10%, into the dark portions of the binary image.

* * * * *